United States Patent [19]

Landoll et al.

[11] Patent Number: 4,746,261
[45] Date of Patent: May 24, 1988

[54] SELF-LOADING TILT-BED TRAILER HAVING TRANSVERSE BED REALIGNMENT MEANS

[75] Inventors: Donald R. Landoll; Alfred R. Belknap; Michael C. Domine; Kyle D. Swart, all of Marysville, Kans.

[73] Assignee: Landoll Corporation, Marysville, Kans.

[21] Appl. No.: 9,680

[22] Filed: Feb. 2, 1987

[51] Int. Cl.$^4$ .............................................. B60P 1/04
[52] U.S. Cl. .................................. 414/475; 414/494; 414/500; 414/538
[58] Field of Search ............... 414/471, 475, 477, 480, 414/494, 498, 499, 500, 506, 538, 571

[56] References Cited

U.S. PATENT DOCUMENTS

| | | | |
|---|---|---|---|
| 2,717,707 | 9/1955 | Martin | 414/475 |
| 2,753,064 | 7/1956 | Lesser | 414/475 |
| 3,485,400 | 12/1969 | Pewthers | 414/477 |
| 3,934,740 | 1/1976 | Rumell | 414/500 X |
| 4,125,198 | 11/1978 | Landoll | 414/484 |
| 4,231,710 | 11/1980 | Landoll | 414/475 |
| 4,492,507 | 1/1985 | Landoll et al. | 414/475 |
| 4,616,726 | 10/1986 | Johansson | 180/135 |

Primary Examiner—Robert J. Spar
Assistant Examiner—Stuart J. Millman
Attorney, Agent, or Firm—Hovey, Williams, Timmons & Collins

[57] ABSTRACT

The self-loading tilt bed trailer has an elongated tiltable bed normally disposed in a substantially horizontal road traveling position that may be tilted about a transverse horizontal axis to a downwardly and rearwardly inclined position. The bed is pivotally coupled at its front end to a towing tractor for pivotal movement of the bed about a substantially vertical axis. When the bed is tilted steeply enough to raise the wheels completely off the ground so the weight of the bed is supported only by a ground-engaging pad at the rear of the bed and the tractor at the front, actuation of a hydraulic cylinder associated with the pad causes the rear of the bed to be shifted a short distance to the right or left relative to the stationary pad, pivoting about the upright hitch axis at the tractor. The bed-supporting undercarriage of the trailer may be moved from a rearward, road traveling position to a forward tilt position for decreasing the slope angle necessary to bring the rear end of the bed into engagement with the ground.

12 Claims, 3 Drawing Sheets

SELF-LOADING TILT-BED TRAILER HAVING TRANSVERSE BED REALIGNMENT MEANS

FIELD OF THE INVENTION

The present invention generally relates to trailers for loading and hauling large objects and, more particularly, is concerned with apparatus for aligning the trailer with an object prior to and during loading of that object without moving the tractor to which the trailer is attached.

DESCRIPTION OF THE PRIOR ART

In order to load a large object onto the rear end of a tilt-bed trailer, it is necessary to first align the trailer with the object to be loaded. Presently available trailers are typically aligned with large objects for rear end loading by first backing the trailer up into an aligned position with the object. The bed is then tilted about a substantially horizontal transverse axis so as to bring the rear end of the bed into engagement with the ground, whereupon the object can then be either pulled, pushed, or driven up the rear end of the bed.

Typically, these trailers lack any apparatus for realigning the bed with the object once the tractor has been brought to a halt, which can be particularly troublesome when the object becomes misaligned after being partially loaded onto the bed. In that situation, either the trailer will carry an unbalanced load if loading is allowed to continue or, more likely, the object will have to be unloaded and realigned, either by maneuvering the tractor-trailer or in some way shifting the object. This is then followed by more attempts to properly load the object onto the bed.

Consequently, a need exists for improvements in trailers for hauling and loading large objects which will permit fine tune alignment of the trailers with the object prior to and during loading the object without moving the tractor-trailer itself.

SUMMARY OF THE INVENTION

Accordingly, the present invention provides a trailer for loading and hauling large objects designed to satisfy the aforementioned needs and to overcome the aforementioned shortcomings of the prior practices. The trailer of the present invention can be easily and precisely aligned with the object to be loaded either prior to or during loading of the object onto the trailer by actuating a special assembly at the rear of the bed when the trailer is tilted down to the ground and the trailer's wheels are raised off the ground. With the wheels thusly raised, a ground-engaged pad of the assembly can remain stationarily disposed while a hydraulic cylinder pushes the bed sideways to the slight extent necessary to bring the bed into alignment with the load. Thereafter, loading may continue in the usual way.

DETAILED DESCRIPTION

Figure 1:
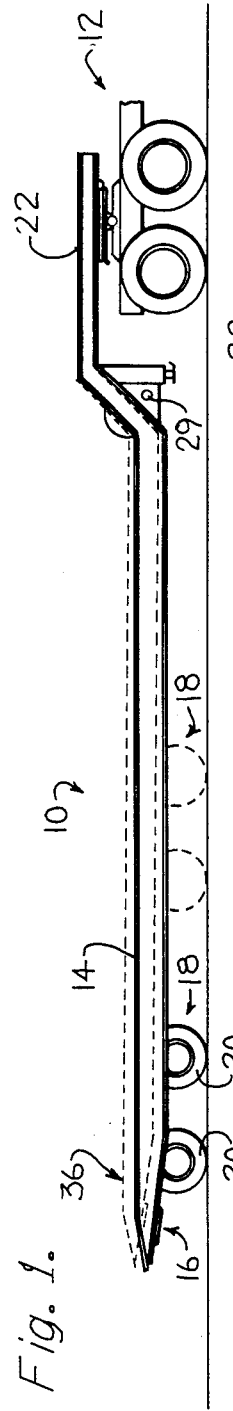
FIG. 1 is a side elevational view of a trailer having an alignment assembly constructed in accordance with the present invention shown coupled to a draft vehicle (only partially shown) and illustrating in broken lines the undercarriage of the trailer shifted to a forward position.

A trailer 10 is shown in a road traveling position in FIG. 1 coupled behind a draft vehicle or tractor 12 (only partially shown). The trailer 10 includes an elongated flat bed 14, an alignment assembly 16 and an undercarriage 18 having a plurality of ground engaging wheels 20 for supporting the bed 14 in a normally horizontal disposition. The undercarriage 18 is mounted underneath the bed 14 for selective fore-and-aft reciprocation relative to the bed 14 between a rearward position shown in solid lines in FIG. 1 and a forward position shown in broken lines in the same figure. Although not disclosed herein, it will be understood that the apparatus for shifting the undercarriage between its various positions may take the form of those disclosed in U.S. Pat. Nos. 4,125,198; 4,231,710; and 4,492,507, all assigned to the assignee of the present invention. The disclosures of those patents are hereby incorporated by reference into the present application for a complete understanding of the nature and operation of the shiftable undercarriage 18.

Figure 4:
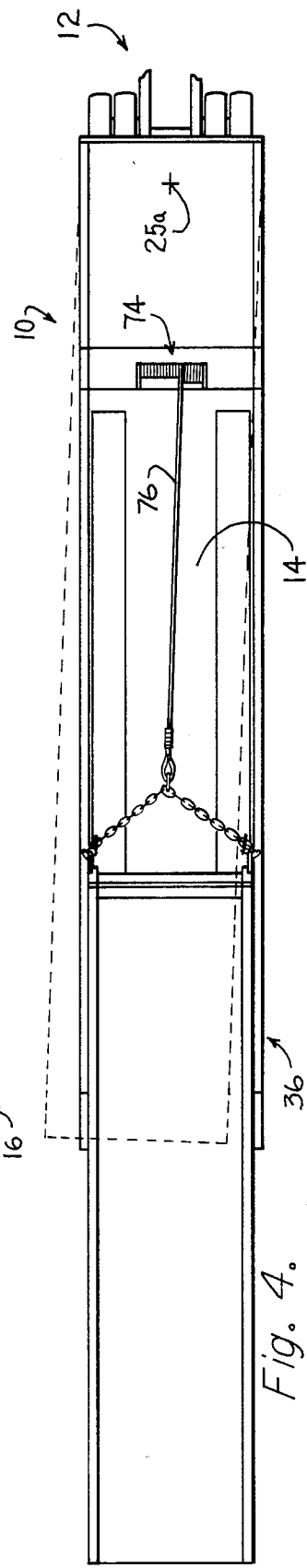
FIG. 4 is a top plan view of the bed aligned with the partially loaded container but illustrating in broken lines an unaligned position of the bed from which it could be pivoted to the aligned position shown in solid lines.
Figure 5:
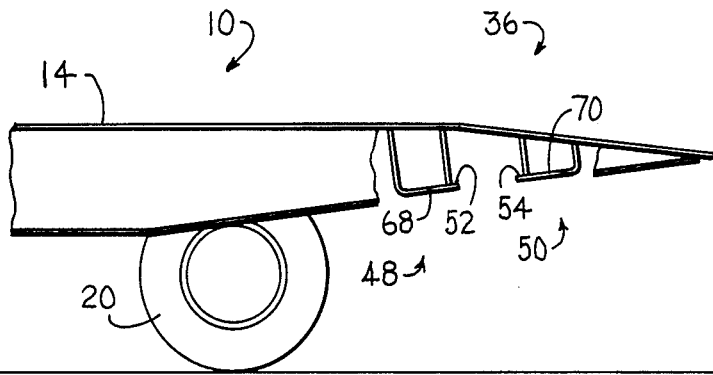
FIG. 5 is an enlarged, fragmentary, side elevational view of the rear end of the bed having portions cut away for clarity to show guide channels for the transversely shiftable pad member of the alignment assembly (with the pad member removed)

The bed 14 is coupled at its front end 22 by coupling means 24 to the fifth wheel hitch 25 of the draft vehicle 12. As will be readily understood by those skilled in the art, the fifth wheel hitch 25 permits pivotal movement of the bed 14 about a vertical axis 25a (FIG. 4) during road traveling and also has means to permit the trailer to stay hitched to tractor 12 while the front end of bed 14 is raised up during rear tilting of bed 14. The coupling means 24 includes an inverted L-shaped element 26 which is pivotally connected at its rearwardmost end by transverse pivot 29 to the bed 14 and is secured at its forwardmost end to the raisable, hinging plate 25b of fifth wheel hitch 25, the plate 25b being swingable about transverse hinge pivot 31. A piston 28 and cylinder 30 serve as a tilting mechanism 32 which extends between the front end 22 of the bed 14 and a forward portion 34 of of the L-shaped element 26. The tilting mechanism 32 serves to raise the front end 22 of the bed 14 so as to tilt a rearward end 36 of the bed 14 downwardly and rearwardly about a substantially horizontal and transverse axis formed by an axle 38 of the undercarriage 18.

The alignment assembly 16 is located adjacent and beneath the rear end 36 of the bed 14. Assembly 16 includes a ground engageable pad member 42 which is supported by a pair of transverse structural channels 48,50 for transverse shifting movement across the rear end 36 of the bed 14. The assembly 16 also includes a selectively operable, double-acting, hydraulic piston and cylinder unit 43 for effecting such shifting of the member 42 relative to the bed 14. The channels 48,50 provide a pair of opposing parallel transverse tracking ledges 52,54 for guiding the member 42 along its transverse path of travel.

Figure 6:
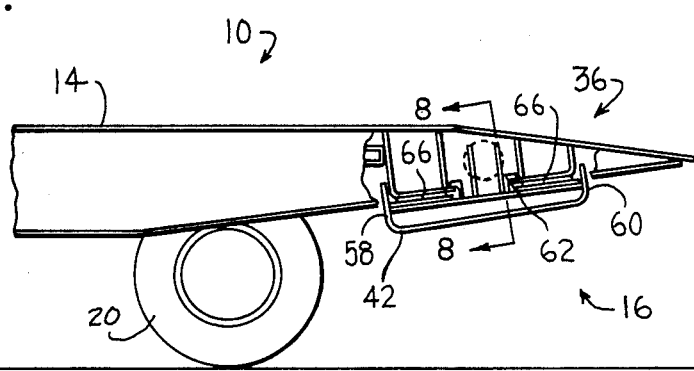
FIG. 6 is an enlarged, fragmentary, side elevational view of the rear end of the trailer showing portions thereof cut away to show the alignment assembly.
Figure 7:
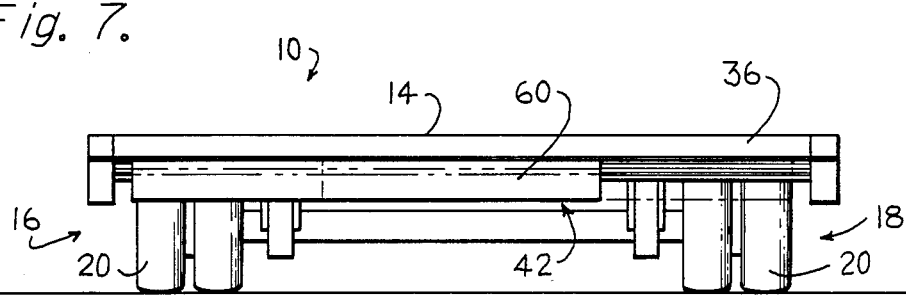
FIG. 7 is an enlarged, rear elevational view of the trailer in its road traveling position showing the pad member of the alignment assembly shifted to a leftward position in solid lines and to a rightward position in phantom lines.

The elongated ground engageable pad member 42 is generally U-shaped in cross-section, as illustrated in FIG. 6, and includes a top plate 56 which extends between and is fixedly attached to upturned sidewalls 58,60 of member 42. Three sets of upstanding and outturned tracking fingers 62 at spaced locations along plate 56 hook over and ride on ledges 52,54 for limiting member 42 to substantially transverse movement. The fingers 62 thus serve to couple the member 42 with the channels 48,50. Four friction reducing pads 66 are attached to the top of plate 56 in position to bear against the lower walls 68,70 of channels 48,50 for reducing the friction between the channels and the ground engageable member during shifting of the latter.

Figure 8:
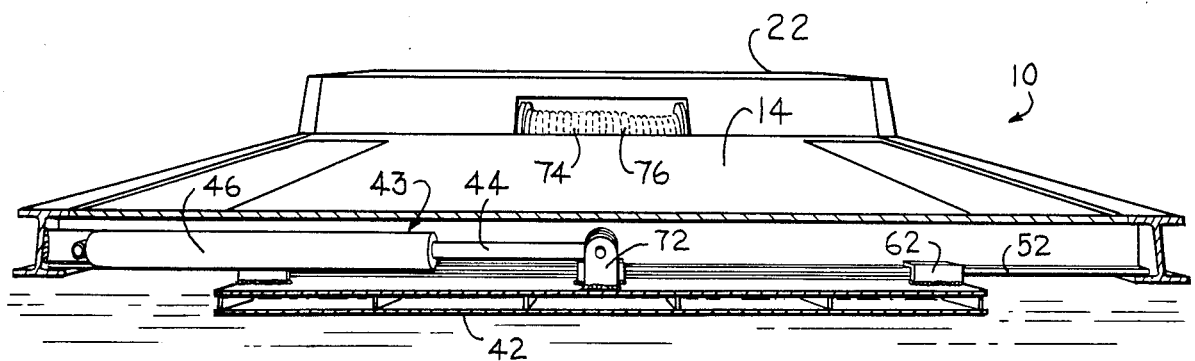
FIG. 8 is a rear perspective view of the bed with the rearmost portion shown in cross-section taken substantially along line 8—8 of FIG. 6.
Figure 9:
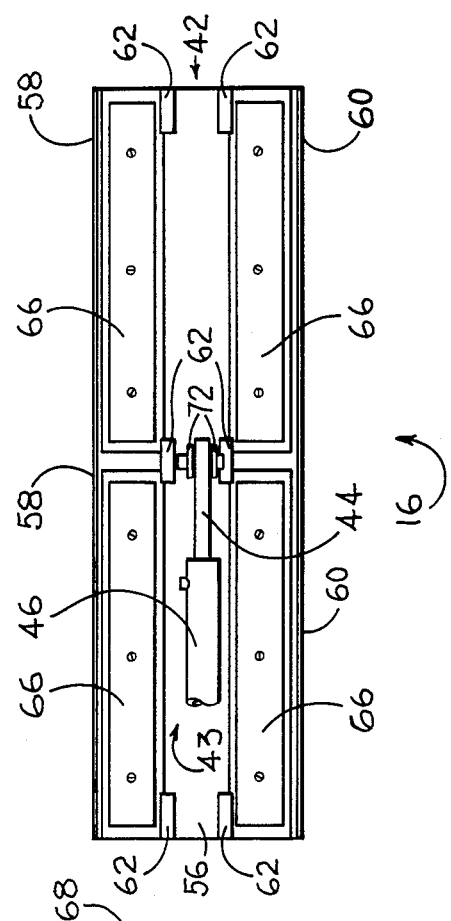
FIG. 9 is an enlarged top plan view of the alignment assembly.
Figure 11:
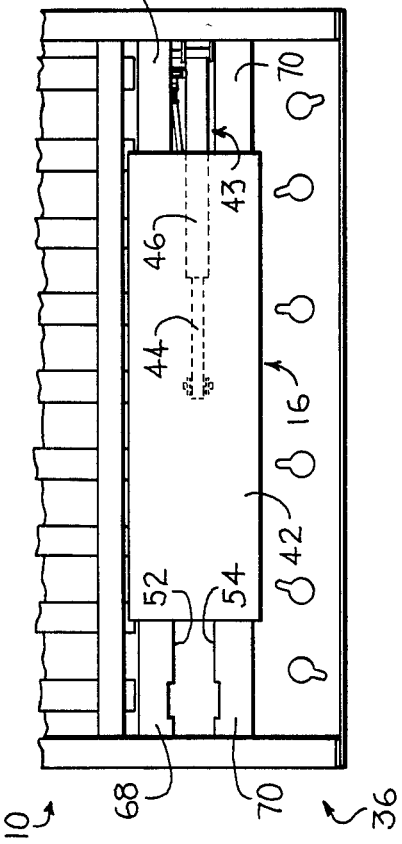
FIG. 11 is an enlarged, fragmentary, bottom plan view of the rear end of the trailer showing the alignment assembly.
Figure 10:
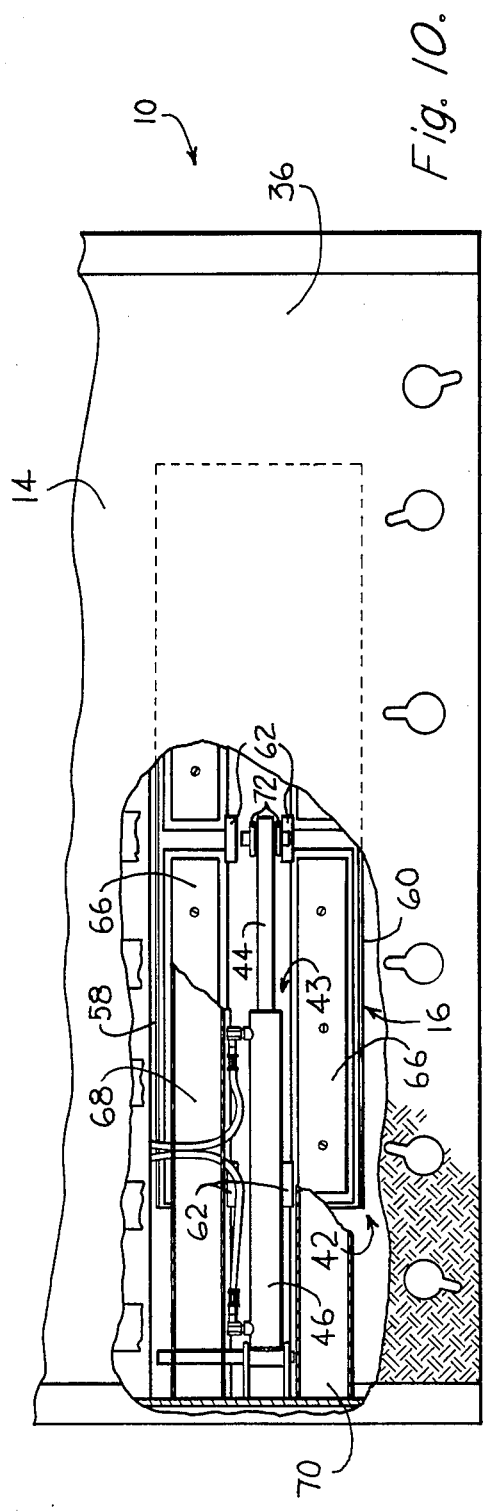
FIG. 10 is an enlarged, fragmentary top plan view of the rear end of the bed having portions thereof cut away to show details of the alignment assembly.

The cylinder 46 of hydraulic unit 43 is attached at one end to the left side of the bed 14 as viewed from the rear in FIG. 8, while the rod 44 extends from the other end of the cylinder 46 and is coupled to the member 42 adjacent the center of the latter. The rod 44 is pivotally attached to the member 42 by bifurcation 72 which is fixedly attached to the member 42 adjacent the center of the latter. The hydraulic unit 43 is housed between the channels 48,50.

A winch 74 is carried by the bed 14 adjacent the front end of the latter and includes a cable 76 for pulling an object up onto the trailer when bed 14 is tilted to the rear.

OPERATION

Figure 2:
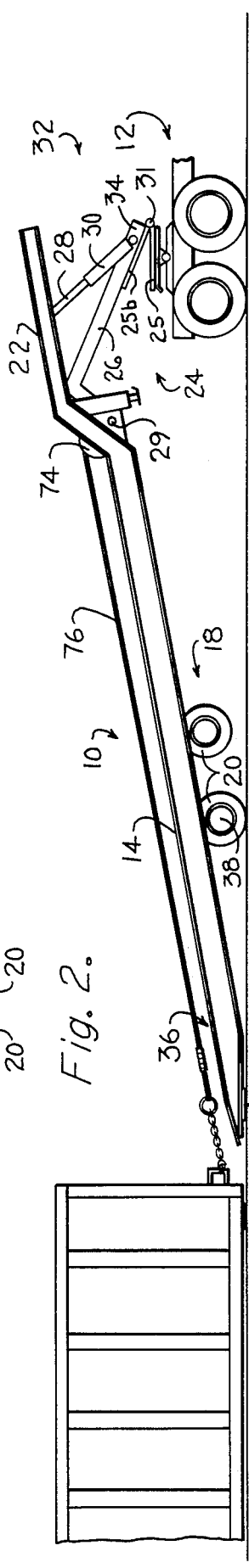
FIG. 2 is a side elevational view of the trailer showing the bed tilted to its loading position and showing a container adjacent the rear end of the bed.

In operation, the trailer 10 is normally disposed in its level, road traveling position as shown, for example, in FIG. 1. When it is desired to load or unload the trailer 10, the bed 14 is tilted to a loading position as shown in FIG. 2 by actuating tilt mechanism 32 so that the ground engagable member 42 contacts the ground to present a smooth, gentle incline for movement of objects onto and off of the bed 14.

In order to reduce the slope angle necessary to tilt the bed 14 into its loading position, the shiftable undercarriage 18 is moved from a rearward position, as illustrated in solid lines in FIG. 1, to a forward position relative to the bed 14 as illustrated in broken lines in FIG. 1. With the undercarriage 18 so positioned, the piston 28 of the tilting mechanism 32 is extended so as to raise the front end 22 of the bed 14 and thereby tilt the rear end 36 of the bed 14 about a transverse horizontal axis formed by axle 38.

When an object is being pulled onto the bed 14 with the winch 74 and cable 76, it is not always possible to keep the object aligned properly with the longitudinal axis of the bed. Sometimes, the object may be out of alignment even before the loading process is begun. This condition is illustrated by the phantom position of the bed in FIG. 4 relative to the object being loaded.

Figure 3:
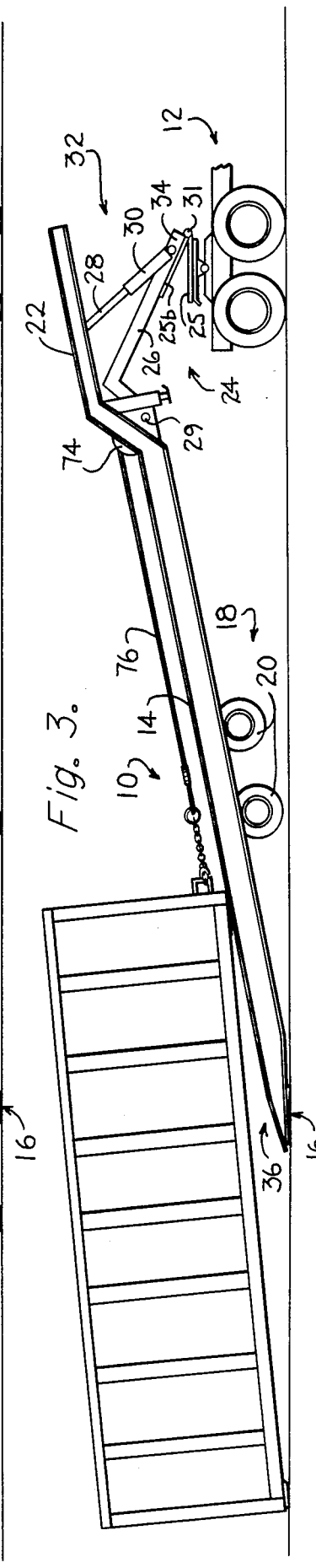
FIG. 3 is a side elevational view of the trailer showing the bed in position for actuation of the realignment assembly, and wherein the undercarriage is raised off the ground with a container partially loaded onto the bed.

Realignment of the object and the bed 14 can be accomplished by first operating the tilting mechanism 32 an additional amount so as to further extend the piston 28 and thereby raise the front end 22 of the bed 14 until the undercarriage 18 is raised completely off the ground to its realigning position as illustrated in FIG. 3 so as to avoid resistance from the wheels to transverse movement of the bed. With the weight of the bed 14 thus borne solely by the pad member 42 and hitch 25, actuation of hydraulic alignment unit 43 to extend rod 44 causes bed 14 to shift leftwardly (as viewed from the rear), pivoting about the vertical axis 25a at hitch 25.

If, instead, rightward shifting of bed 14 is required, the operator merely causes rod 44 to retract into cylinder 46 to the extent desired.

Once the bed 14 and the object have been realigned, the bed 14 can then be returned to its loading position by lowering the front end 22 of the bed 14 until the undercarriage 18 re-engages the ground. Winch 74 may then be reactuated to complete pulling the object onto the bed. The trailer 10 can then be returned to its road traveling position by lowering the front end 22 of the bed 14 until the bed is in a substantially horizontal position and then moving the undercarriage 18 from its forward position to a rearward position adjacent the rear end 36 of the bed 14.

We claim:

1. In a trailer for loading and hauling large objects, the improvement comprising:
    an elongated tiltable bed normally disposed in a substantially horizontal road traveling position;
    a mechanism coupled with said bed for tilting the latter about a tranverse horizontal axis from said road traveling position to a downwardly and rearwardly inclined position;
    means for pivotally coupling a front end of said bed to a towing tractor for pivotal movement of said bed relative to the tractor about a substantially vertical axis; and
    an alignment assembly coupled with said bed for adjustably moving the rear end of the bed about said vertical axis when the bed is in said inclined position to align the bed with the object to be loaded.

2. In a trailer as claimed in claim 1, wherein said coupling means is extensible between said bed and the tractor for maintaining coupling therebetween when said bed is in said inclined position.

3. In a trailer as claimed in claim 2, wherein said mechanism is a hydraulic cylinder and piston unit.

4. In a trailer as claimed in claim 1, wherein said alignment assembly is located underneath and adjacent the rear end of said bed, said assembly having a member disposed for engaging the ground when said bed is tilted downwardly and rearwardly to a loading position and means for shifting the rear end of said bed relative to said member in a transverse direction so that the rear end of said bed will be pivoted about said vertical axis.

5. In a trailer as claimed in claim 4, wherein said alignment assembly includes means for reducing friction between said member and said bed during shifting of the latter.

6. In a trailer as claimed in claim 4, the improvement further comprising a wheeled, bed-supporting undercarriage disposed adjacent the rear end of the bed therebelow, said undercarriage being in engagement with the ground when said bed is in said loading position, said tilting mechanism being disposed for raising the front end of said bed upwardly so that the bed is tilted from said loading position to an alignment position wherein said undercarriage is lifted off the ground while said member remains in engagement with the ground.

7. In a trailer as claimed in claim 6, the improvement further comprising an apparatus for interconnecting the bed and the undercarriage for shifting the latter, said undercarriage being shiftable forwardly relative to the bed to a position intermediate the ends of the latter for reducing the slope angle of the bed necessary to bring the bed into said loading and alignment positions.

8. In a trailer as claimed in claim 7, the improvement further comprising means carried by the bed for loading an object onto said bed.

9. In a trailer as claimed in claim 8, wherein said loading means includes a winch and cable for pulling said object forwardly onto the rear end of said bed and completely onto said bed.

10. In a trailer as claimed in claim 1, the improvement further comprising means carried by the bed for loading the object onto said bed.

11. In a trailer as claimed in claim 10, wherein said loading means includes a winch and cable for pulling the object forwardly onto the rear end of said bed and completely onto said bed.

12. For use in combination with a towing vehicle having a hitch, a self-loading trailer for large objects comprising:
- an elongated bed having means at the front end thereof for coupling the trailer with said hitch in a manner to permit the bed to swing from side-to-side about a vertical axis at the hitch;
- an undercarriage beneath said bed and having a plurality of ground wheels,
- said coupling means including a mechanism for selectively raising the front end of the bed when the bed is hitched to the vehicle whereby to tilt the bed downwardly and rearwardly about said ground wheels for loading of the bed,
- said undercarriage being selectively movable fore-and-aft of the bed to permit disposing the ground wheels at a rearward location for over-the-road travel and at a forward location for loading, whereby to reduce the tilt angle of the bed for loading;
- means on the bed adapted for connection with the object to be loaded and for pulling the object up onto the bed when the latter is tilted downwardly and rearwardly; and
- a bed realignment assembly including a member underneath the bed adjacent the rear end of the latter in disposition for engaging the ground when the bed is tilted downwardly and rearwardly,
- said mechanism being operable to raise the front end of the bed to such an extent that, with the undercarrige in its forwardly shifted position, the ground wheels may be disposed completely off the ground with the weight of the bed supported by said member of the realignment assembly and the hitch of the vehicle,
- said assembly further including means operably interconnecting the member and the bed for selectively adjustably shifting the bed in a transverse direction relative to the member and about said vertical axis of the hitch while the ground wheels are disposed off the ground, whereby to permit realignment of the bed relative to the object to be loaded without moving the vehicle.

* * * * *